United States Patent
Watanabe et al.

(10) Patent No.: US 12,447,700 B2
(45) Date of Patent: Oct. 21, 2025

(54) MOLD, APPARATUS, AND METHOD FOR PRODUCING METAL-RESIN COMPOSITE

(71) Applicant: KABUSHIKI KAISHA KOBE SEIKO SHO (KOBE STEEL, LTD.), Hyogo (JP)

(72) Inventors: Kenichi Watanabe, Kobe (JP); Ryohei Ihara, Kobe (JP); Zenzo Yamaguchi, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 17/833,370

(22) Filed: Jun. 6, 2022

(65) Prior Publication Data
US 2022/0396041 A1 Dec. 15, 2022

(30) Foreign Application Priority Data
Jun. 10, 2021 (JP) .................. 2021-097316

(51) Int. Cl.
B29C 70/68 (2006.01)
B29C 70/84 (2006.01)
B29K 101/10 (2006.01)
B29K 105/00 (2006.01)

(52) U.S. Cl.
CPC .......... B29C 70/683 (2013.01); B29C 70/682 (2013.01); B29C 70/84 (2013.01); *B29K 2101/10* (2013.01); *B29K 2105/256* (2013.01)

(58) Field of Classification Search
CPC ... B29C 45/14377; B29C 70/72; B29C 70/84; B29C 70/683; B29C 70/682; B21D 22/02; B21D 22/21; B21D 22/22
See application file for complete search history.

(56) References Cited

U.S. PATENT DOCUMENTS 10,919,284 B2 2/2021 Thomas et al.
2013/0082416 A1* 4/2013 Wakeman ............... B29C 33/14
264/259

(Continued)

FOREIGN PATENT DOCUMENTS

DE 10 2013 105 673 A1 12/2014
DE 10 2015 203 642 A1 9/2016

(Continued)

OTHER PUBLICATIONS

Kenji (English Translation of JP2020104411). (Year: 2020).*

(Continued)

*Primary Examiner* — Michael A Tolin
*Assistant Examiner* — Hana C Page
(74) *Attorney, Agent, or Firm* — Studebaker Brackett PLLC

(57) ABSTRACT

A mold for producing a metal-resin composite by press-forming a metal member and integrally molding the metal member that is press-formed and a resin material includes an upper mold and a lower mold that sandwich the metal member and the resin material. The upper mold includes a first press surface for press-forming the metal member and a second press surface for integrally molding the metal member and the resin material. A distance between the first press surface and the lower mold is shorter than a distance between the second press surface and the lower mold.

5 Claims, 10 Drawing Sheets

(56) References Cited

U.S. PATENT DOCUMENTS

2013/0108835 A1* 5/2013 Kamiya ............ B29C 45/14786
428/483
2017/0001407 A1 1/2017 Yamashita et al.
2019/0366654 A1* 12/2019 Ueno ...................... B29C 70/56

FOREIGN PATENT DOCUMENTS

EP        1 506 729 A1    2/2005
JP        2013-212603 A   10/2013
JP        2020-104411 A   7/2020

OTHER PUBLICATIONS

The extended European search report issued by the European Patent Office on Oct. 14, 2022, which corresponds to European Patent Application No. 22174853.6-1014 and is related to U.S. Appl. No. 17/833,370.
An Office Action mailed by the Japanese Patent Office on Jun. 11, 2024, which corresponds to Japanese Patent Application No. 2021-097316 and is related to U.S. Appl. No. 17/833,370; with English language translation.

* cited by examiner

MOLD, APPARATUS, AND METHOD FOR PRODUCING METAL-RESIN COMPOSITE

CROSS-REFERENCE TO RELATED APPLICATIONS

This application claims priority of Japanese Patent Application No.: 2021-097316 filed on Jun. 10, 2021, the content of which is incorporated herein by reference.

BACKGROUND OF THE INVENTION

Technical Field

The present invention relates to a mold, an apparatus, and a method for producing a metal-resin composite.

Related Art

An apparatus for producing a metal-resin composite by press-forming a metal member and a thermosetting resin material is known (for example, JP 2020-104411 A). The metal-resin composite is integrally molded by press-forming a metal member previously press-formed by a press device separate from the above device and a resin material with the above device. That is, in the production of the metal-resin composite, a mold for press-forming a metal member and a mold for integrally molding the metal member and a resin material are used.

SUMMARY

In a case where the metal-resin composite is molded using a set of molds, a metal member is press-formed into a predetermined shape, and then the metal member and a resin material are press-formed using a mold used for the press-forming of the metal member. In this case, since a cavity of the mold is designed in accordance with a shape of the metal-resin composite, that is, a final shape into which the metal member and the resin material are integrally molded, it is difficult to press-form the metal member along a lower mold, and molding accuracy of the metal member may be deteriorated.

An object of the present invention is to improve molding accuracy of a metal member in a mold, an apparatus, and a method for producing a metal-resin composite with a set of molds.

According to a first aspect of the present invention, there is provided a mold for producing a metal-resin composite by press-forming a metal member and integrally molding the metal member that is press-formed and a resin material.

The mold includes an upper mold and a lower mold that sandwich the metal member and the resin material.

The upper mold includes: a first press surface for press-forming the metal member; and a second press surface for integrally molding the metal member and the resin material, and a distance between the first press surface and the lower mold is shorter than a distance between the second press surface and the lower mold when the metal member is press-formed.

In a case where press-forming of the metal member and integral molding of the metal member and the resin material are performed by a set of molds, when a mold in which a molding surface of the upper mold and a molding surface of the lower mold are separated from each other by a thickness of the metal member and the resin material in a state where the upper mold and the lower mold are closed is used, the metal member cannot be pressed by the molding surface of the upper mold and the molding surface of the lower mold, and the metal member cannot be molded along a shape of the molding surface of the lower mold. In contrast, according to this configuration, since the distance between the first press surface for molding the metal member and the lower mold is shorter than the distance between the second press surface for integrally molding the metal member and the resin material and the lower mold, the metal member easily follows the shape of the lower mold during press-forming of the metal member. As a result, molding accuracy of the metal member can be improved.

A distance between the first press surface and the lower mold may be set to be at least partially equal to a thickness of the metal member in a state where the upper mold and the lower mold are closed.

Here, "equal" is design setting. Further, "equal" is not limited to a case of being equal in a strict sense. That is, the distance between the first press surface and the lower mold does not need to be strictly equal to the thickness of the metal member. The term "equal" includes "equal" in a strict sense and a form slightly deviated from "equal" in a strict sense within a range allowed for molding accuracy of the metal member.

According to this configuration, since the distance between the first press surface and the lower mold is set to be at least partially equal to the thickness of the metal member, the metal member can be molded along the shape of the molding surface of the lower mold. As a result, molding accuracy of the metal member can be improved.

The metal-resin composite may have a bottom wall portion extending in a horizontal direction and side wall portions rising from both ends of the bottom wall portion in a cross section perpendicular to a longitudinal direction, the upper mold may include a first molding upper surface that includes the first press surface and the second press surface, and molds the bottom wall portion, and a second molding upper surface that molds the side wall portion, and the first press surface may be provided continuously with the second molding upper surface.

According to this configuration, since the periphery of a corner portion formed by the bottom wall portion and the side wall portion of the metal-resin composite can be pressed by the first press surface, molding accuracy of the corner portion can be improved.

A plurality of the first press surfaces may be intermittently arranged along the longitudinal direction.

According to this configuration, since a plurality of the first press surfaces are intermittently arranged along the longitudinal direction, when the metal member and the resin material are integrally molded, the resin material flows between the second molding upper surface and the metal member through a portion where the first press surface is not arranged. In this manner, the side wall portion in which the metal member and the resin material are integrally molded can be molded.

The upper mold may include an upper mold main body on which the second press surface is formed, and a movable portion on which the first press surface is formed, the movable portion being movably attached to the upper mold main body, and the movable portion may be movable to a protruding position where the first press surface is closer to the lower mold than the second press surface and a retracting position where the first press surface and the second press surface are flush with each other.

According to this configuration, the metal member is press-formed in a state where the movable portion is at the protruding position, and the metal member and the resin material are integrally molded in a state where the movable portion is at the retracting position, so that a portion from which the resin material is removed is not formed in the molded metal-resin composite, and decrease in strength of the metal-resin composite can be suppressed.

According to a second aspect of the present invention, there is provided an apparatus for producing a metal-resin composite by press-forming a metal member and integrally molding the metal member that is press-formed and a resin material. The mold includes an upper mold and a lower mold that sandwich the metal member and the resin material, and a drive unit that moves at least one of the upper mold and the lower mold in a vertical direction. The upper mold includes: a first press surface for press-forming the metal member; and a second press surface for integrally molding the metal member and the resin material, and a distance between the first press surface and the lower mold is shorter than a distance between the second press surface and the lower mold when the metal member is press-formed.

In a case where press-forming of the metal member and integral molding of the metal member and the resin material are performed by a set of molds, when a mold in which a molding surface of the upper mold and a molding surface of the lower mold are separated from each other by a thickness of the metal member and the resin material in a state where the upper mold and the lower mold are closed is used, the metal member cannot be pressed by the molding surface of the upper mold and the molding surface of the lower mold, and the metal member cannot be molded along a shape of the molding surface of the lower mold. In contrast, according to this configuration, since the distance between the first press surface for molding the metal member and the lower mold is shorter than the distance between the second press surface for integrally molding the metal member and the resin material and the lower mold, the metal member easily follows the shape of the lower mold during press-forming of the metal member. As a result, molding accuracy of the metal member can be improved.

According to a third aspect of the present invention, there is provided a method for producing a metal-resin composite by press-forming a metal member and integrally molding the metal member that is press-formed and a resin material. The method includes: preparing an upper mold and a lower mold, the upper mold including a first press surface for press-forming the metal member and a second press surface for integrally molding the metal member and the resin material; press-forming the metal member with the first press surface of the upper mold and the lower mold by closing the upper mold and the lower mold; arranging the resin material on the metal member that is press-formed by opening the upper mold and the lower mold; and integrally molding the metal member and the resin material with the second press surface of the upper mold and the lower mold by closing the upper mold and the lower mold. A distance between the first press surface and the lower mold is shorter than a distance between the second press surface and the lower mold when the metal member is press-formed.

In a case where press-forming of the metal member and integral molding of the metal member and the resin material are performed by a set of molds, when a mold in which a molding surface of the upper mold and a molding surface of the lower mold are separated from each other by a thickness of the metal member and the resin material in a state where the upper mold and the lower mold are closed is used, the metal member cannot be pressed by the molding surface of the upper mold and the molding surface of the lower mold, and the metal member cannot be molded along a shape of the molding surface of the lower mold. In contrast, according to this configuration, since the distance between the first press surface for molding the metal member and the lower mold is shorter than the distance between the second press surface for integrally molding the metal member and the resin material and the lower mold, the metal member easily follows the shape of the lower mold during press-forming of the metal member. As a result, molding accuracy of the metal member can be improved.

According to the present invention, in a mold, an apparatus, and a method for producing a metal-resin composite by a set of molds, molding accuracy of a metal member can be improved.

BRIEF DESCRIPTION OF THE DRAWINGS

The foregoing and the other features of the present invention will become apparent from the following description and drawings of an illustrative embodiment of the invention in which.

DETAILED DESCRIPTION OF EMBODIMENTS

Hereinafter, a mold, an apparatus, and a method for producing a metal-resin composite will be described as an embodiment of the present invention with reference to the accompanying drawings.

First Embodiment

Figure 1:
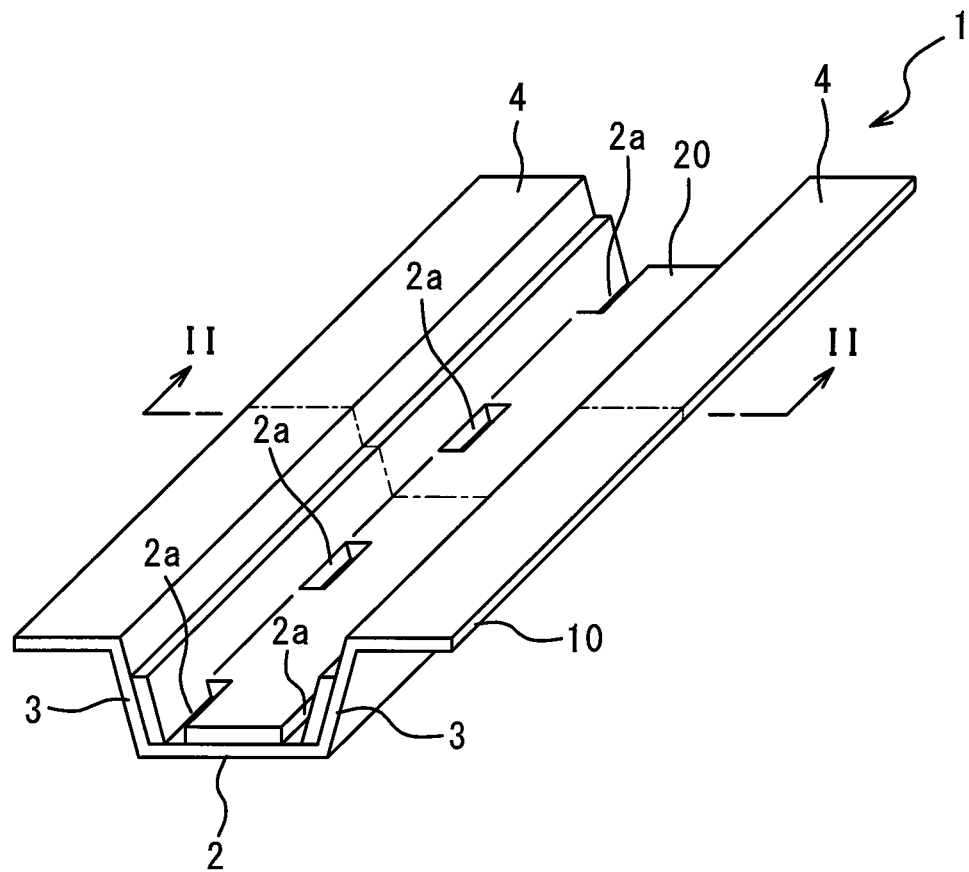
FIG. 1 is a perspective view of a metal-resin composite according to a first embodiment of the present invention.
Figure 2:
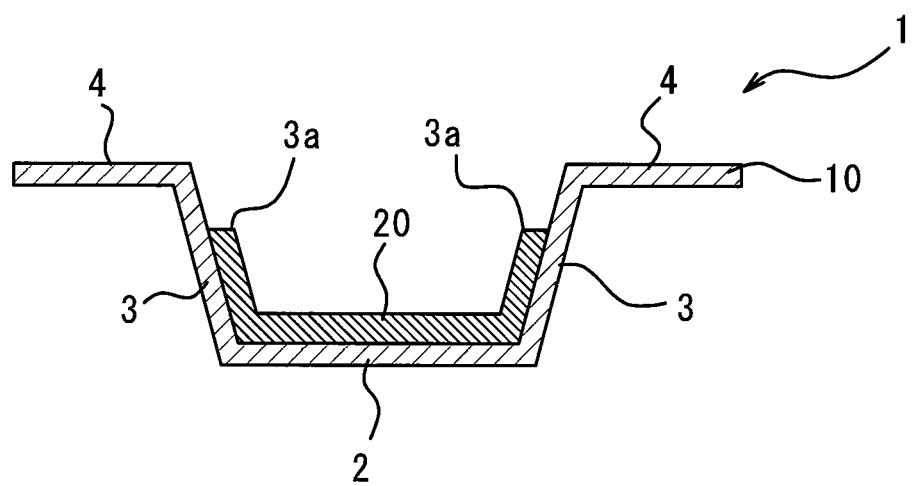
FIG. 2 is a cross-sectional view taken along line II-II in FIG. 1.

Referring to FIGS. 1 and 2, a metal-resin composite 1 produced in the present embodiment includes a metal plate (metal member) 10 and a resin material 20. As illustrated in FIG. 2, the metal-resin composite 1 has a hat shape in a cross section perpendicular to a longitudinal direction. Specifically, the metal-resin composite 1 is formed by fixing the resin material 20 to an inner surface (recessed surface) of the metal plate 10 having a hat shape. However, the shape of the metal-resin composite 1 is not limited to a hat shape, and may be any shape.

The metal-resin composite 1 includes a bottom wall portion 2 extending in the horizontal direction, side wall portions 3 rising from both ends of the bottom wall portion 2, and a flange portion 4 extending outward in the horizontal direction from the side wall portion 3. Further, the side wall portion 3 is provided with a step portion 3a in which the thickness of the resin material 20 decreases from the bottom wall portion 2 toward the flange portion 4. The bottom wall portion 2 includes the metal plate 10 and the resin material 20, the side wall portion 3 includes the metal plate 10 and the resin material 20, and the flange portion 4 includes only the metal plate 10. More specifically, the side wall portion 3 includes the metal plate 10 and the resin material 20 further on the bottom wall portion 2 side than the step portion 3a, and includes only the metal plate 10 further on the flange portion 4 side than the step portion 3a.

As illustrated in FIG. 1, the bottom wall portion 2 is provided with eight (only five in FIG. 1) holes 2a. The hole 2a is a space where the resin material 20 does not exist. Four of the holes 2a are provided at each of both ends of the bottom wall portion 2 in a lateral direction. Further, the holes 2a are intermittently arranged along a longitudinal direction of the bottom wall portion 2. More specifically, the holes 2a are arranged side by side at equal intervals along the longitudinal direction of the bottom wall portion 2.

A mold 100, an apparatus 50, and a method for producing the metal-resin composite 1 according to the present embodiment will be described with reference to FIGS. 3 to 8. In the drawings, the horizontal direction is indicated as an X direction, and the vertical direction is indicated as a Y direction.

In the present embodiment, press-forming is performed twice while first to fifth processes illustrated in FIGS. 4 to 8 are executed sequentially. First pressing is executed in the first to third processes illustrated in FIGS. 4 to 6, and second pressing is executed in the third to fifth processes illustrated in FIGS. 6 to 8.

Figure 4:
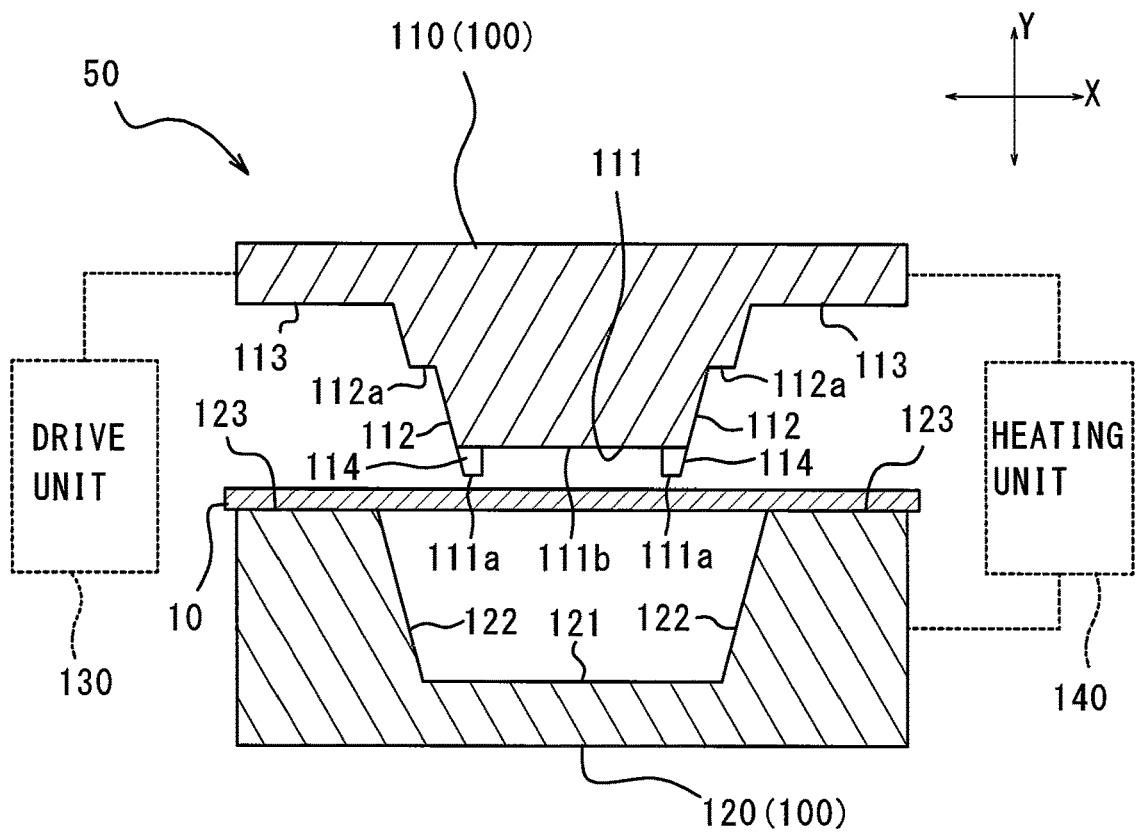
FIG. 4 is a cross-sectional view illustrating a first process of a method for producing the metal-resin composite in the first embodiment.

Referring to FIG. 4, the apparatus 50 for producing the metal-resin composite 1 in the present embodiment includes the mold 100, a drive unit 130 that drives the mold 100, and a heating unit 140 that heats the mold. Note that, as the drive unit 130 and the heating unit 140, publicly-known units capable of executing press-forming can be used, and details are not illustrated and a conceptual diagram is illustrated only in FIG. 4, and illustration is omitted in FIG. 5 and subsequent figures.

The mold 100 is for press-forming the metal plate 10 and the resin material 20 to produce the metal-resin composite 1. The mold 100 includes an upper mold 110 and a lower mold 120 that sandwich the metal plate 10 and the resin material 20. In the present embodiment, the upper mold 110 is configured as a punch, and the lower mold 120 is configured as a die. The upper mold 110 is movable in the vertical direction by the drive unit 130, that is, is configured to be capable of approaching and separating from the lower mold 120. However, a driving mode of the mold 100 by the drive unit 130 is not particularly limited, and the drive unit 130 can move at least one of the upper mold 110 and the lower mold 120 in the vertical direction.

Figure 3:
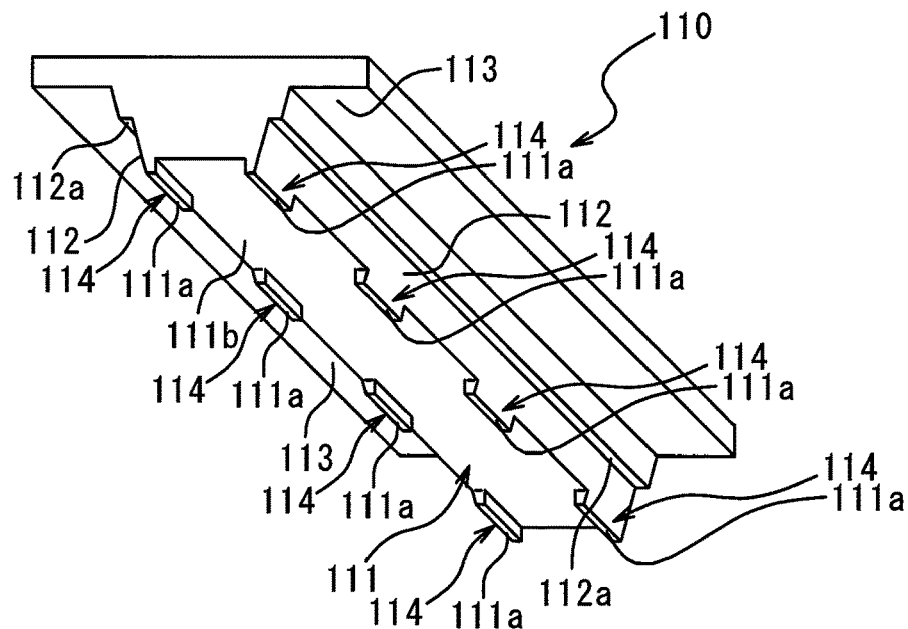
FIG. 3 is a perspective view of an upper mold according to the first embodiment.

Referring also to FIGS. 3 and 4, the upper mold 110 has a first molding upper surface 111 for molding the bottom wall portion 2 (see FIG. 1), a second molding upper surface 112 for molding the side wall portion 3 (see FIG. 1), and a third molding upper surface 113 for molding the flange portion 4 (see FIG. 1). In the present embodiment, the first molding upper surface 111 and the third molding upper surface 113 are configured as horizontal surfaces, and the second molding upper surface 112 is configured to connect the first molding upper surface 111 and the third molding upper surface 113 and to be inclined from the vertical direction.

In the present embodiment, the upper mold 110 is provided with eight protruding portions 114 protruding downward from the first molding upper surface 111. Four of the protruding portions 114 are provided at each of both ends in the lateral direction of the first molding upper surface 111. Further, the protruding portions 114 are intermittently arranged along the longitudinal direction of the upper mold 110. More specifically, the protruding portions 114 are arranged side by side at equal intervals along the longitudinal direction of the upper mold 110.

The first molding upper surface 111 includes a first press surface 111a provided at a lower end of the protruding portion 114 and a second press surface 111b provided above the protruding portion 114. The first press surface 111a and the second press surface 111b are configured as horizontal surfaces. The first press surface 111a and the second press surface 111b are both provided continuously with the second molding upper surface 112.

In the present embodiment, a step 112a is provided on the second molding upper surface 112. The step 112a is provided so as to rise one step from the first molding upper surface 111 toward the third molding upper surface 113.

The lower mold 120 has a first molding lower surface 121 for molding the bottom wall portion 2 (see FIG. 1), a second molding lower surface 122 for molding the side wall portion 3 (see FIG. 1), and a third molding lower surface 123 for molding the flange portion 4 (see FIG. 1). In the present embodiment, the first molding lower surface 121 and the third molding lower surface 123 are configured as horizontal surfaces, and the second molding lower surface 122 is configured to connect the first molding lower surface 121 and the third molding lower surface 123 and to be inclined from the vertical direction. The first molding lower surface 121 is arranged to face the first molding upper surface 111, the second molding lower surface 122 is arranged to face the second molding upper surface 112, and the third molding lower surface 123 is arranged to face the third molding upper surface 113.

In a first process illustrated in FIG. 4, the metal plate 10 having a flat plate shape before molding is placed on the lower mold 120.

Figure 5:
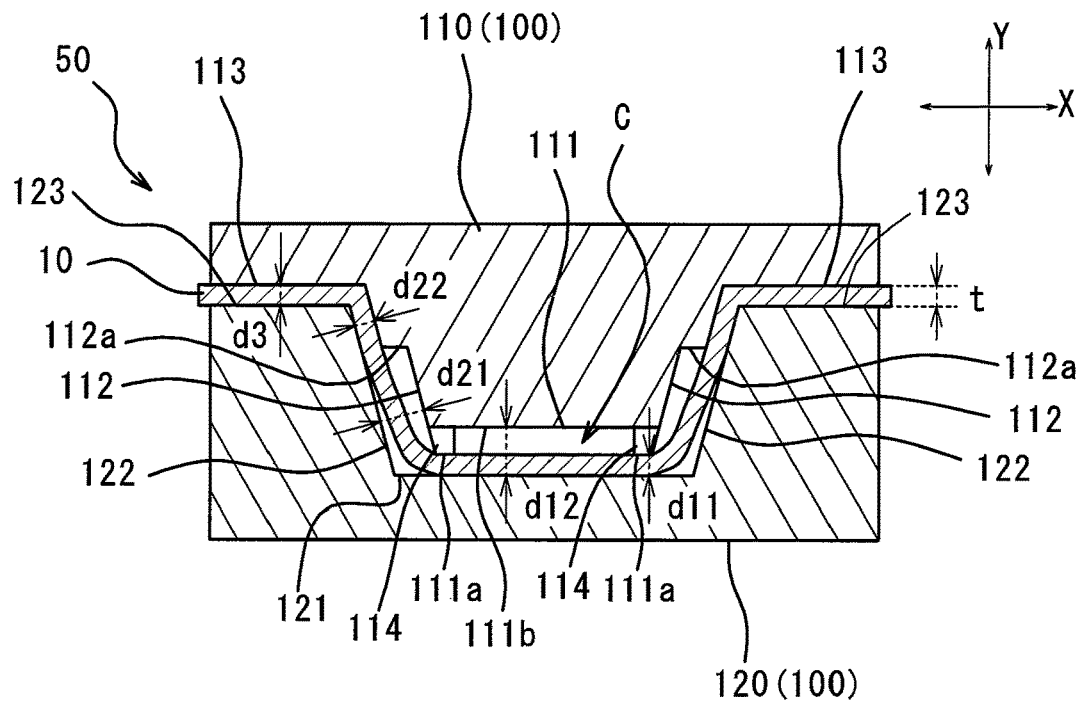
FIG. 5 is a cross-sectional view illustrating a second process of the method for producing the metal-resin composite in the first embodiment.

In a second process illustrated in FIG. 5, the upper mold 110 is lowered, and the metal plate 10 is sandwiched between the upper mold 110 and the lower mold 120 and press-formed into a substantially hat shape. In a state where the upper mold 110 and the lower mold 120 are closed, a distance d11 between the first press surface 111a of the first molding upper surface 111 and the first molding lower surface 121 is equal to a thickness t of the metal plate 10 (d11=t). By setting the distance d11 equal to the thickness t of the metal plate 10, the molding accuracy of the metal plate 10 can be improved. Further, a distance d12 between the second press surface 111b of the first molding upper surface 111 and the first molding lower surface 121 is larger than the thickness t of the metal plate 10 (d12>t), and a distance d3 between the third molding upper surface 113 and the third molding lower surface 123 is substantially equal to the thickness t of the metal plate 10 (d3=t). A distance d21 between the second molding upper surface 112 and the second molding lower surface 122 below the step 112a is larger than the thickness t of the metal plate 10 (d21>t), and a distance d22 between the second molding upper surface 112 and the second molding lower surface 122 above the step 112a is substantially equal to or slightly larger than the thickness t of the metal plate 10 (d22=t or d22>t). In particular, by setting the distance d22 equal to the thickness t of the metal plate 10, filling pressure of the resin material 20 in a subsequent process can be increased. Note that, in this process, the resin material 20 (see FIGS. 4 to 7) is not provided yet, and only metal plate 10 is sandwiched between the upper mold 110 and the lower mold 120. A cavity C to be filled with the resin material 20 is provided between the first and second molding upper surfaces 111 and 112 and the first and second molding lower surfaces 121 and 122 (specifically, the metal plate 10).

Figure 6:
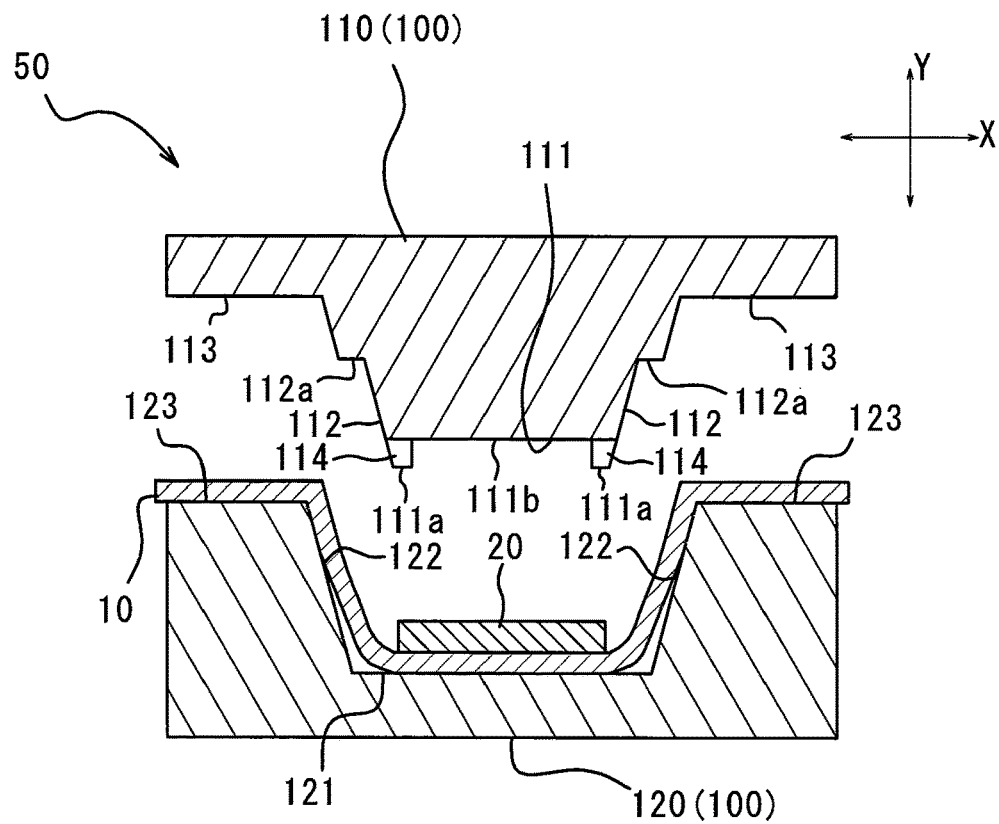
FIG. 6 is a cross-sectional view illustrating a third process of the method for producing the metal-resin composite in the first embodiment.

In a third process illustrated in FIG. 6, the upper mold 110 is raised. At this time, the metal plate 10 is molded into a shape close to a final shape (a hat shape in the present embodiment). Then, the resin material 20 having a sheet-like shape (also referred to as prepreg) cut into a necessary size is placed on the metal plate 10. In the present embodiment, the resin material 20 is cured at a high temperature and a high pressure by a molding method called sheet molding compound (SMC) method (see the fourth process described later). In the present embodiment, as the resin material 20, a fiber reinforced plastic (FRP) in which a glass fiber or a carbon fiber is impregnated into resin is used. Further, in the present embodiment, the resin material 20 has a thermosetting property. In this process, the resin material 20 is not yet heated, that is, not cured. Note that the resin material 20 does not need to have a sheet-like shape, and can have any shape.

Figure 7:
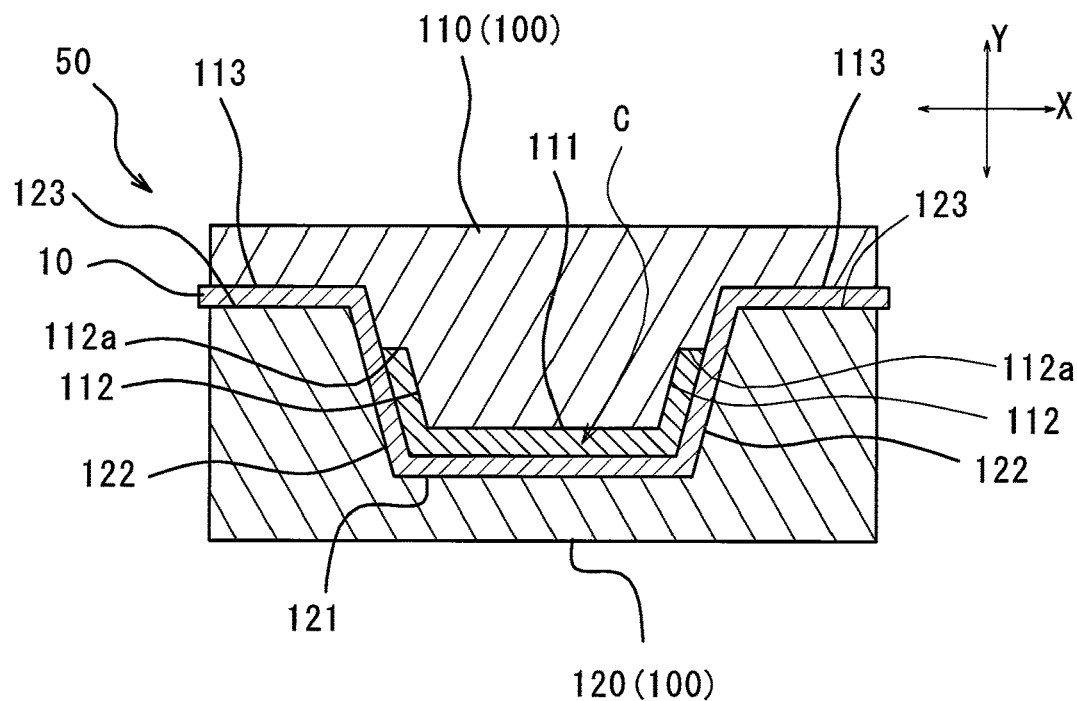
FIG. 7 is a cross-sectional view illustrating a fourth process of the method for producing the metal-resin composite in the first embodiment.

In a fourth process illustrated in FIG. 7, the upper mold 110 is lowered, and the metal plate 10 and the resin material 20 are sandwiched between the upper mold 110 and the lower mold 120 to be press-formed into a hat shape. At this time, the cavity C is filled with the resin material 20. That is, the resin material 20 cut to a necessary size is put into the mold 100 and cured under high temperature and high pressure by the SMC method. In the present embodiment, the cavity C refers to a space below the step 112a formed by being sandwiched between the upper mold 110 and the lower mold 120 (specifically, the metal plate 10).

When the cavity C is filled with the resin material 20, the resin material 20 passes between the protruding portion 114 (illustrated in FIG. 3) and the protruding portion 114 of the upper mold 110 and flows into a space between the second molding upper surface 112 and the second molding lower surface 122. In this manner, the resin material 20 is included in the side wall portion 3 (illustrated in FIG. 2), and the hole 2a (illustrated in FIG. 1) is formed on the bottom wall portion 2 (illustrated in FIG. 1) at a position corresponding to the protruding portion 114.

Figure 8:
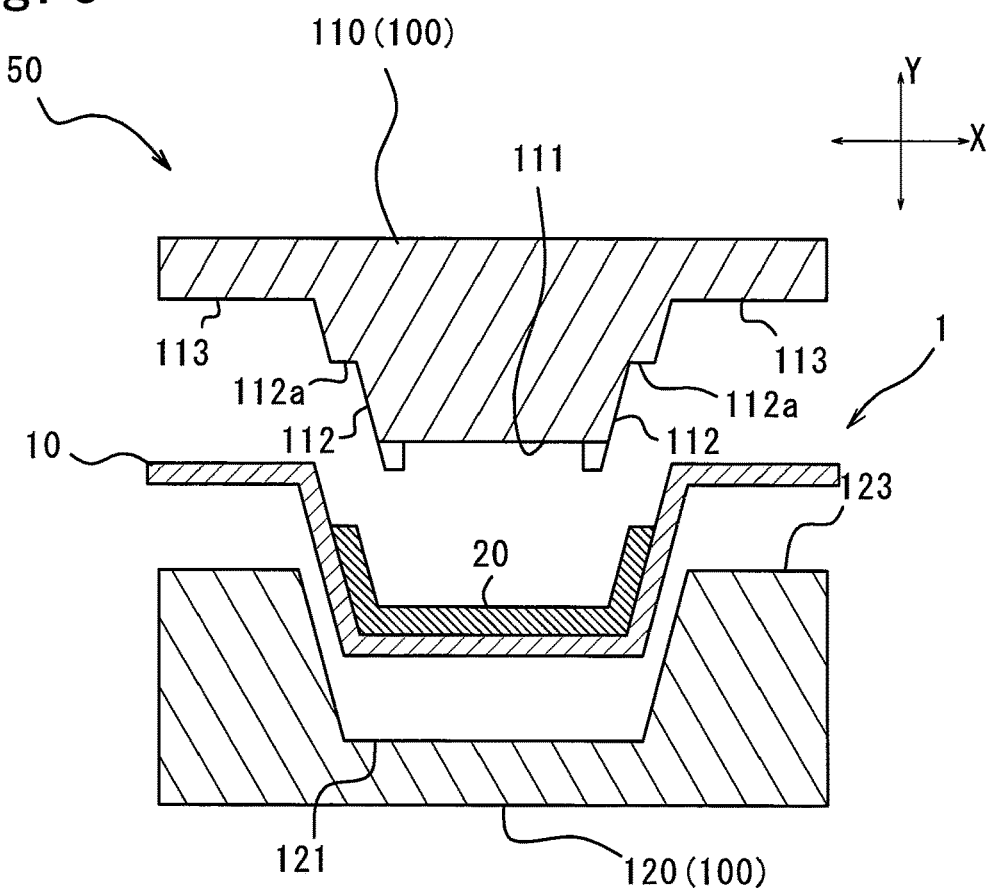
FIG. 8 is a cross-sectional view illustrating a fifth process of the method for producing the metal-resin composite in the first embodiment.
Figure 9:
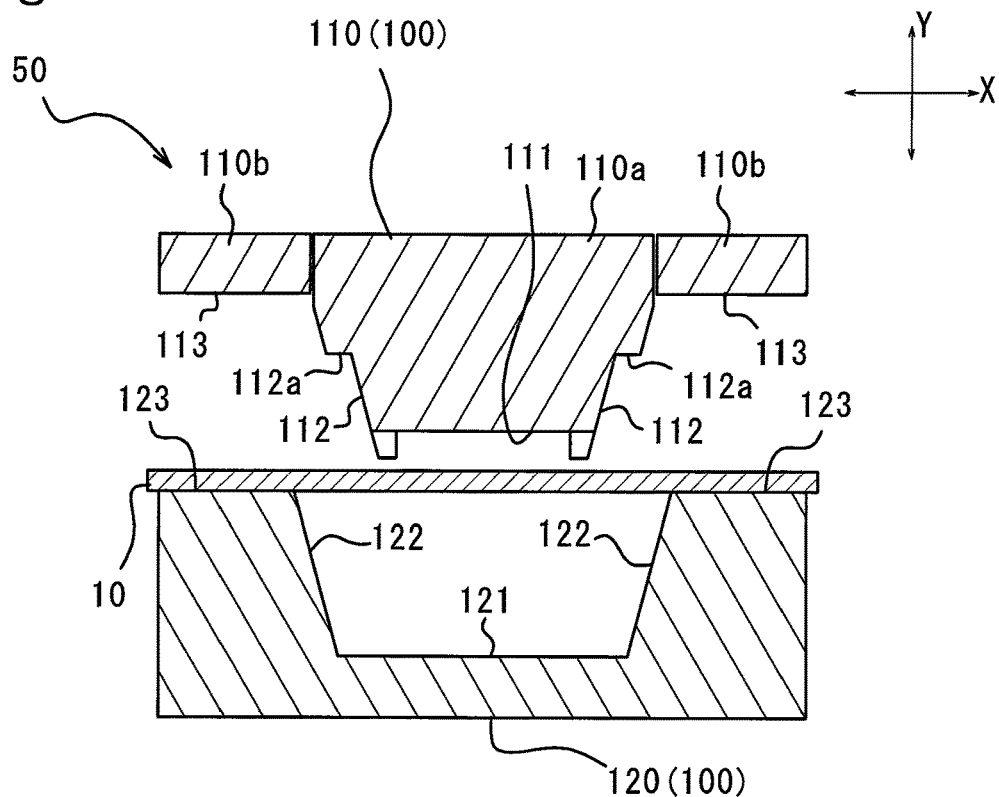
FIG. 9 is a cross-sectional view illustrating a first process of a method for producing a metal-resin composite in a second embodiment.
Figure 10:
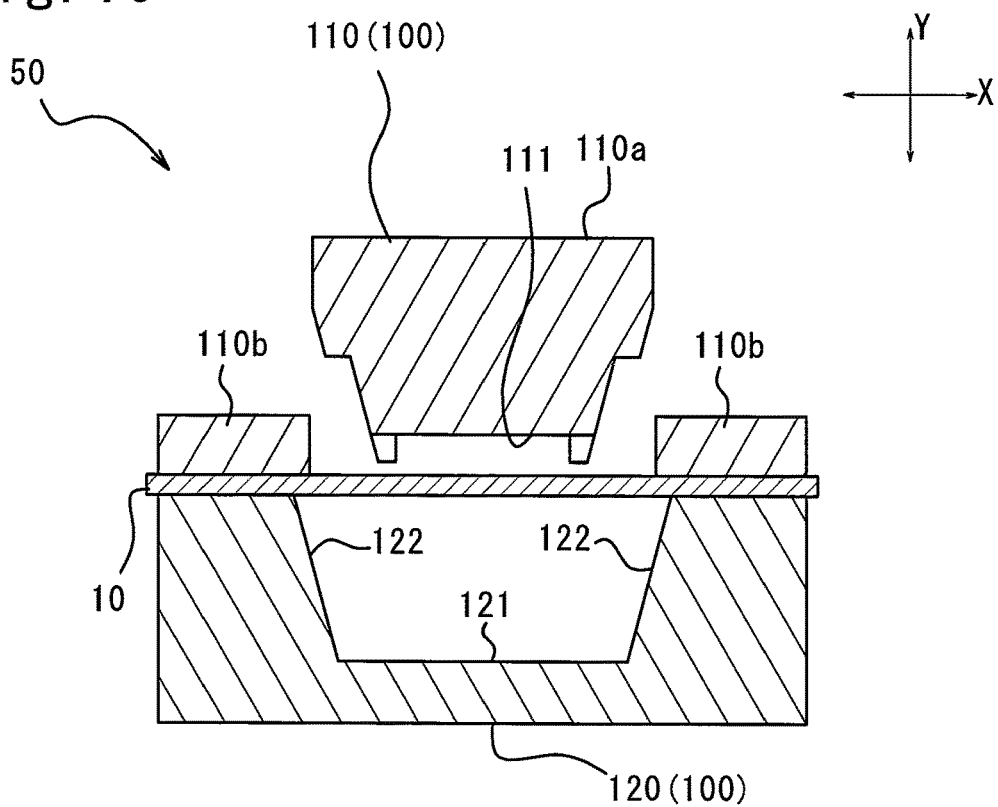
FIG. 10 is a cross-sectional view illustrating a second process of the method for producing the metal-resin composite in the second embodiment.
Figure 11:
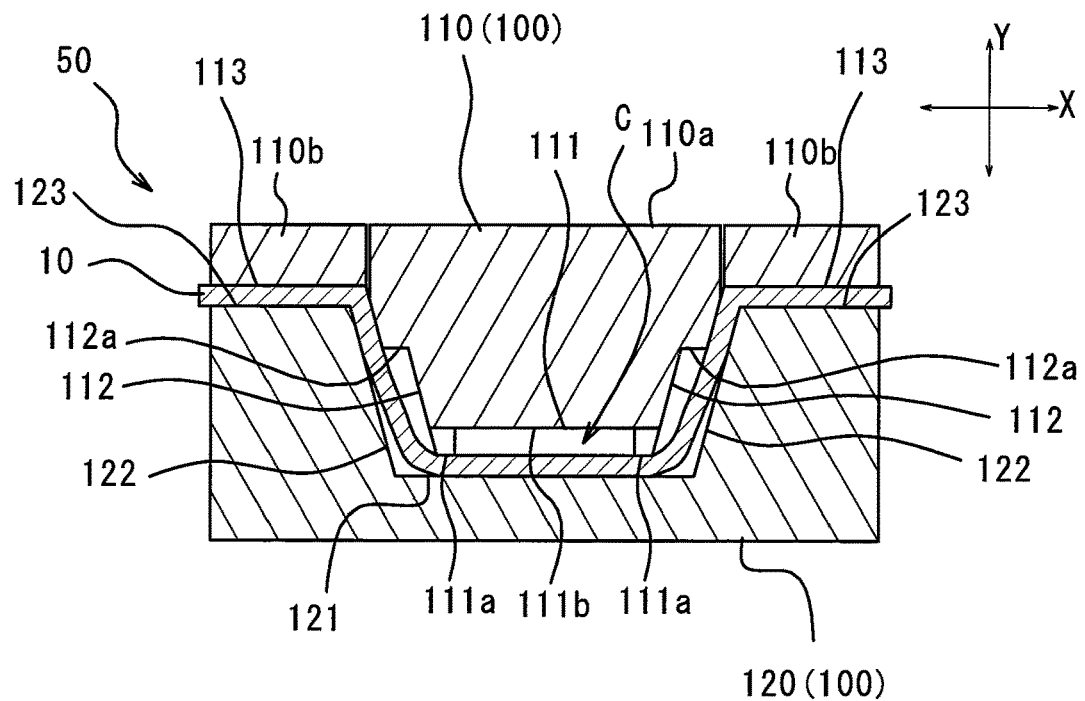
FIG. 11 is a cross-sectional view illustrating a third process of the method for producing the metal-resin composite in the second embodiment.
Figure 12:
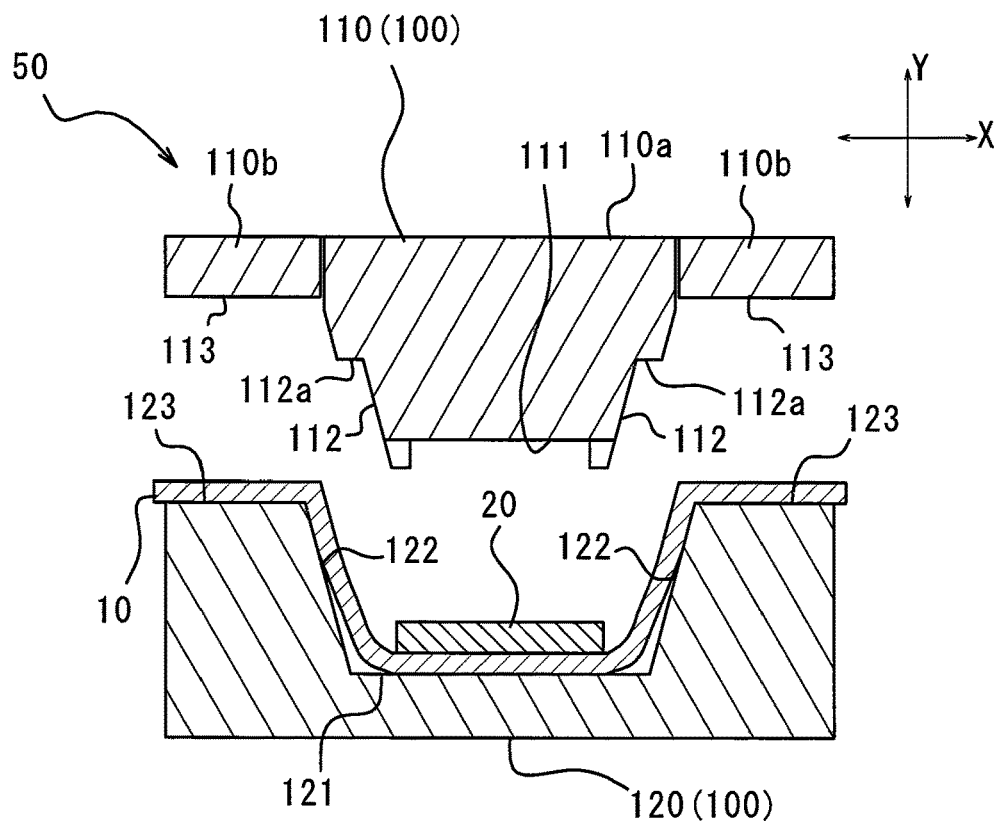
FIG. 12 is a cross-sectional view illustrating a fourth process of the method for producing the metal-resin composite in the second embodiment.
Figure 13:
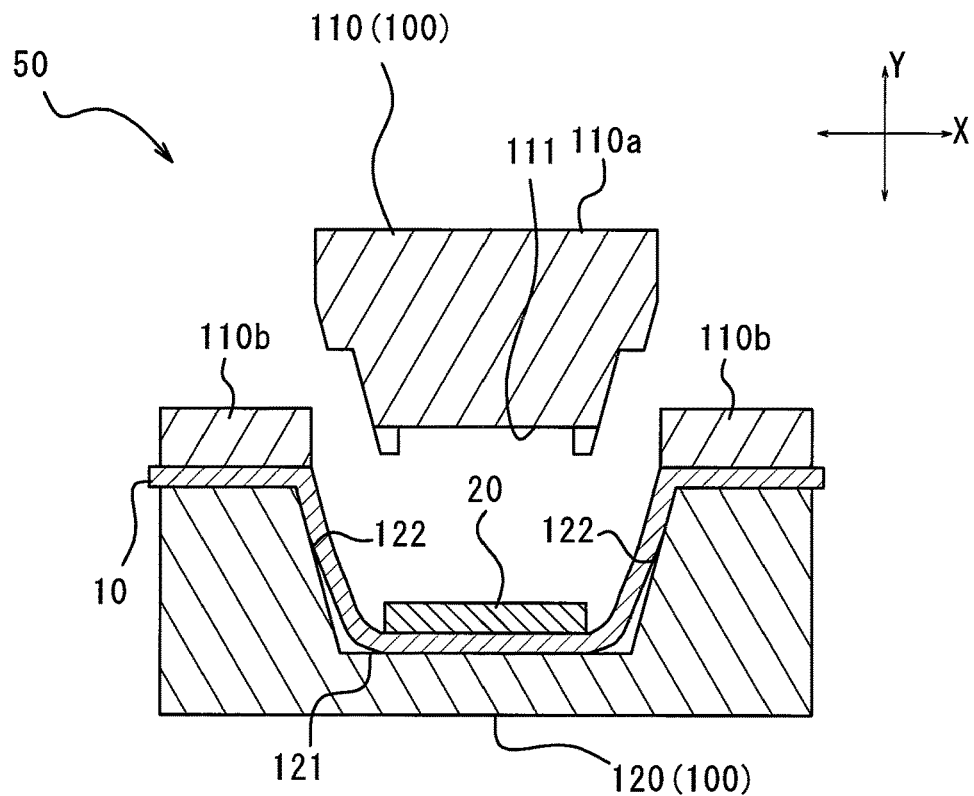
FIG. 13 is a cross-sectional view illustrating a fifth process of the method for producing the metal-resin composite in the second embodiment.
Figure 14:
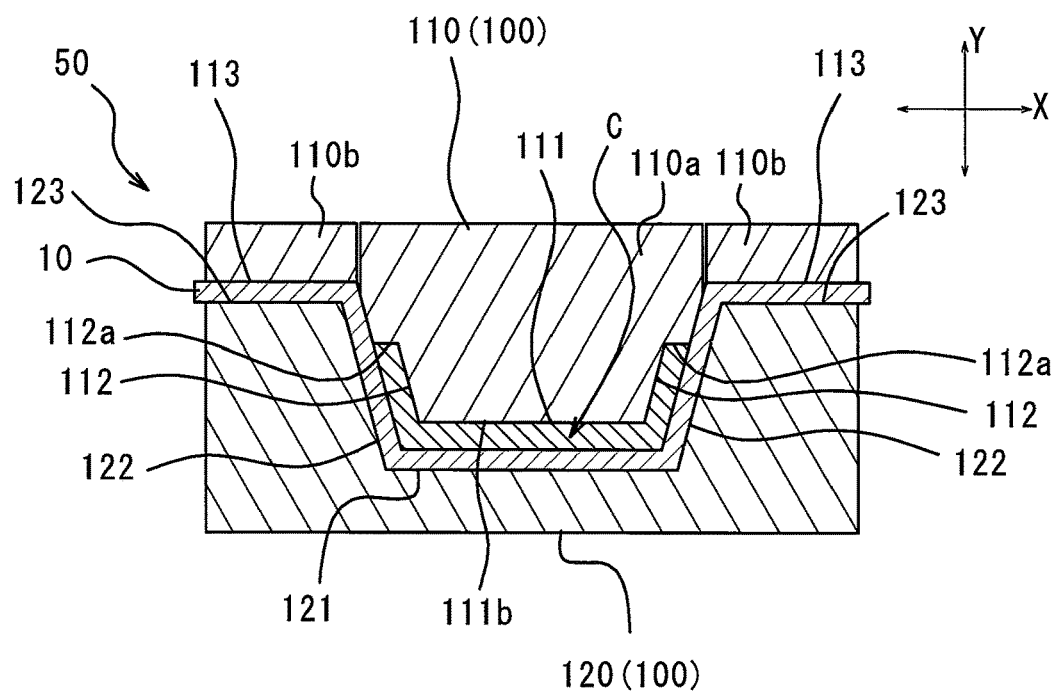
FIG. 14 is a cross-sectional view illustrating a sixth process of the method for producing the metal-resin composite in the second embodiment.
Figure 15:
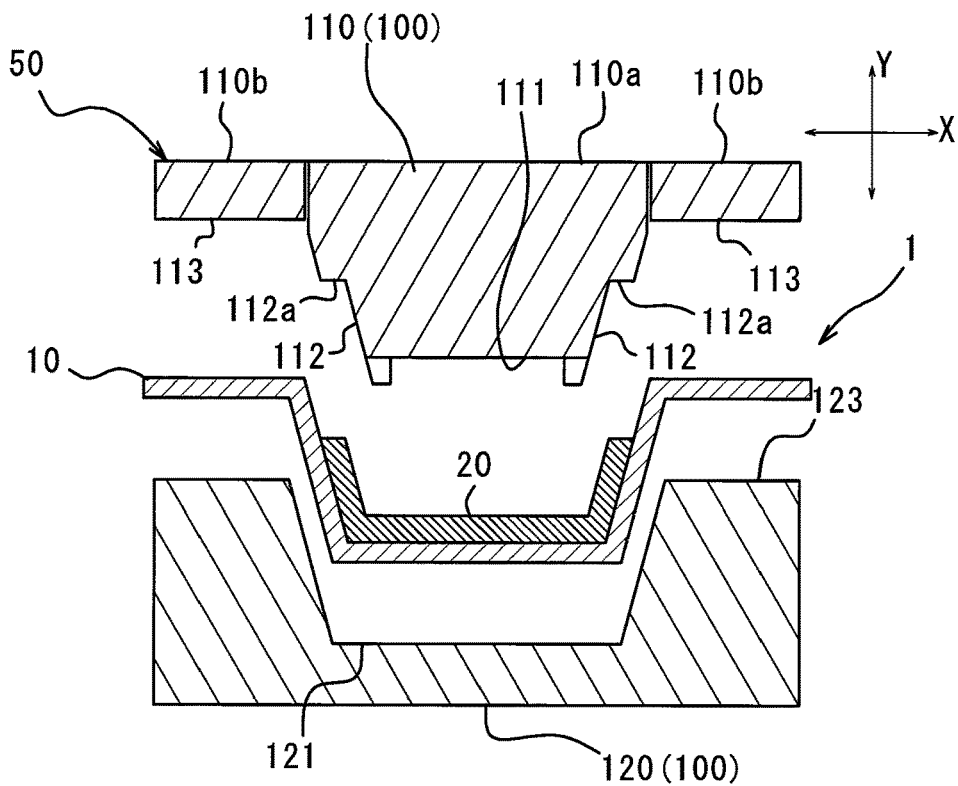
FIG. 15 is a cross-sectional view illustrating a seventh process of the method for producing the metal-resin composite in the second embodiment.

In a fifth process illustrated in FIG. 8, the upper mold 110 is raised. The metal plate 10 is molded into a final shape (a hat shape in the present embodiment), and the resin material 20 is fixed to an upper surface (a hat-shaped recessed surface) of the metal plate 10 so that the metal-resin composite 1 is formed. In this way, the metal-resin composite 1 having a hat shape is produced as a product.

In a case where press-forming of the metal plate 10 and integral molding of the metal plate 10 and the resin material 20 are performed by a set of molds, when a mold in which a molding surface of an upper mold and a molding surface of a lower mold are separated from each other by a thickness of the metal plate 10 and the resin material 20 in a state where the upper mold and the lower mold are closed is used, the metal plate 10 cannot be pressed by the molding surface of the upper mold and the molding surface of the lower mold, and the metal plate 10 cannot be molded along a shape of the molding surface of the lower mold. In contrast, according to the present embodiment, since the first press surface 111a for molding the metal plate 10 is closer to the lower mold than the second press surface 111b for integrally molding the metal plate 10 and the resin material 20, the metal plate 10 easily follows the shape of the lower mold 120 during the press-forming of the metal plate 10. As a result, molding accuracy of the metal plate 10 can be improved.

Since the distance d11 between the first press surface 111a and the first molding lower surface 121 of the lower mold 120 is set to be at least partially equal to the thickness t of the metal plate 10, the metal plate 10 can be molded along the shape of the first molding lower surface 121 of the lower mold 120. As a result, molding accuracy of the metal plate 10 can be improved.

Since the first press surface 111a is provided continuously with the second molding upper surface 112, the periphery of a corner portion formed by the bottom wall portion 2 and the side wall portion 3 of the metal-resin composite 1 can be pressed by the first press surface 111a, so that molding accuracy of the corner portion can be improved.

Since a plurality of the first press surfaces 111a are intermittently arranged along the longitudinal direction, when the metal plate 10 and the resin material 20 are integrally molded, the resin material 20 flows between the second molding upper surface 112 and the metal plate 10 through a portion where the first press surface 111a is not arranged. In this manner, the side wall portion 3 in which the metal plate 10 and the resin material 20 are integrally molded can be molded.

Since the hole 2a is formed at a position corresponding to the protruding portion 114 on the bottom wall portion 2 of the metal-resin composite 1 manufactured by the mold 100 of the present embodiment, the weight of the metal-resin composite 1 can be reduced. Further, in the portion where the hole 2a is formed in the bottom wall portion 2, drilling or the like can be performed on the metal plate 10 without exclusion of the resin material 20.

Second Embodiment

The mold 100, the apparatus 50, and the method for producing the metal-resin composite 1 according to a second embodiment will be described with reference to FIGS. 9 to 15.

In the present embodiment illustrated in FIGS. 9 to 15, the upper mold 110 has a separated punch 110a and a holder 110b. The present embodiment is substantially the same as the first embodiment except for this. Therefore, the description of a portion illustrated in the first embodiment may be omitted.

In the present embodiment, the upper mold 110 includes the holder 110b for pressing the metal plate 10 and the punch 110a for molding. The holder 110b and the punch 110a are independently movable in the vertical direction by the drive unit 130 (see FIG. 2).

In the present embodiment, press-forming is executed twice while first to seventh processes illustrated in FIGS. 9 to 15 are executed sequentially. First pressing is executed in the first to fourth processes illustrated in FIGS. 9 to 12, and second pressing is executed in the fourth to seventh processes illustrated in FIGS. 12 to 15.

In the first pressing of the first to fourth processes illustrated in FIGS. 9 to 12, unlike the first embodiment, the holder 110b descends prior to the punch 110a to press the metal plate 10. Next, the punch 110a descends to press-form the metal plate 10. The first to fourth processes of the present embodiment are substantially the same as the first to third processes of the first embodiment except that the punch 110a and the holder 110b are independently driven as described above.

Also in the second pressing in the fourth to seventh processes illustrated in FIGS. 12 to 15, unlike the first embodiment, the holder 110b descends prior to the punch 110a to press the metal plate 10. Next, the punch 110a descends to press-form the metal plate 10. The fourth to seventh processes of the present embodiment are substantially the same as the third to fifth processes of the first embodiment except that the punch 110a and the holder 110b are independently driven as described above.

Third Embodiment

The mold 100, the apparatus 50, and the method for producing the metal-resin composite 1 according to a third embodiment will be described with reference to FIGS. 16 to 20.

In the present embodiment illustrated in FIGS. 16 to 20, the upper mold 110 has an upper mold main body 115 and a movable portion 116. The present embodiment is substantially the same as the first embodiment except for this. Therefore, the description of a portion illustrated in the first embodiment may be omitted.

In the present embodiment, the upper mold 110 has the upper mold main body 115 on which the second press surface 111b is formed, and the movable portion 116 on which the first press surface 111a is formed and which is movably attached to the upper mold main body 115. The movable portion 116 is movable by a cylinder (not illustrated) to a protruding position where the first press surface 111a is closer to the lower mold 120 than the second press surface 111b and a retracting position where the first press surface 111a and the second press surface 111b are flush with each other.

In the present embodiment, press-forming is executed twice while first to fifth processes illustrated in FIGS. 16 to 20 are executed sequentially. First pressing is executed in the first to third processes illustrated in FIGS. 16 to 18, and second pressing is executed in the third to fifth processes illustrated in FIGS. 18 to 20.

Figure 16:
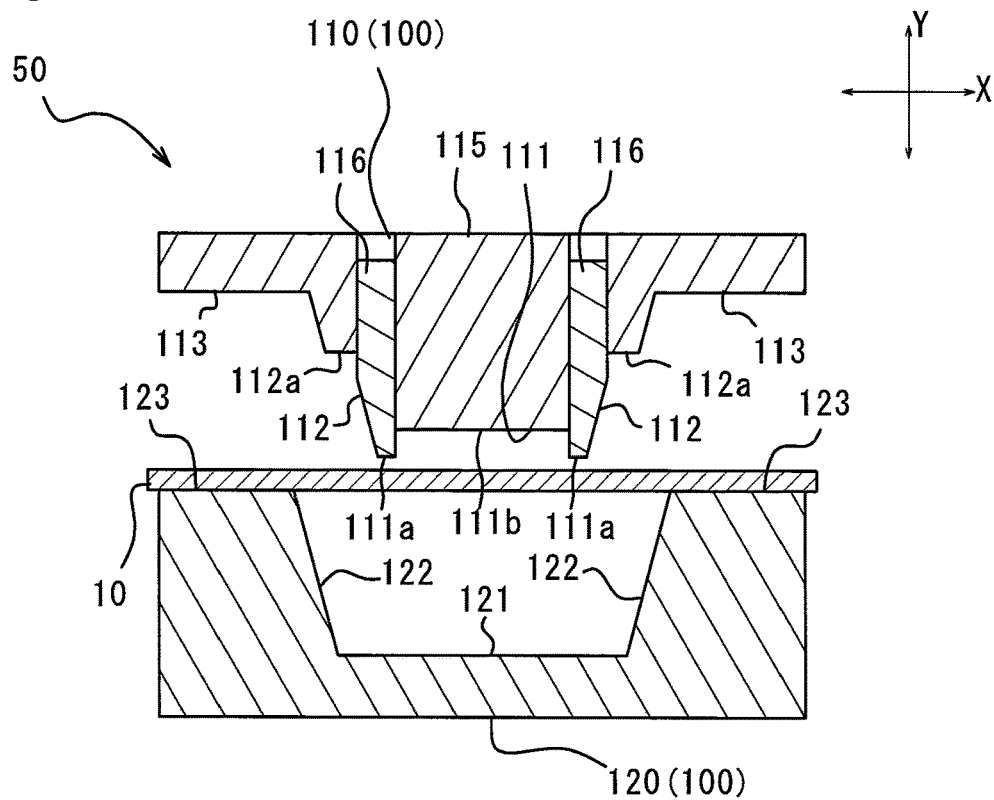
FIG. 16 is a cross-sectional view illustrating a first process of a method for producing a metal-resin composite in a third embodiment.
Figure 17:
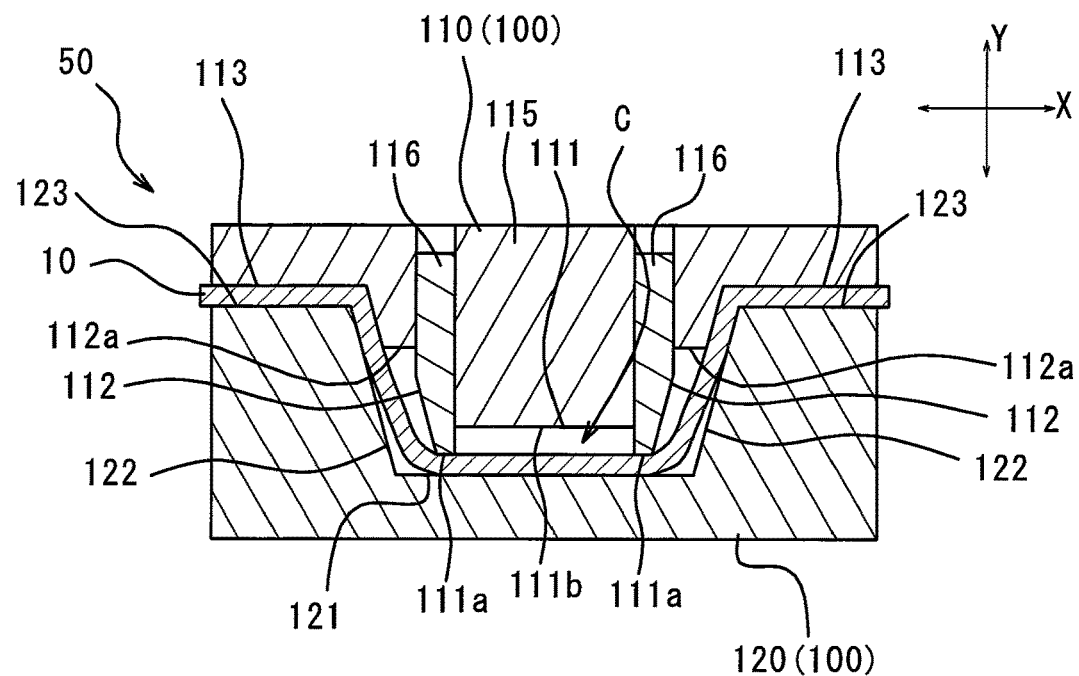
FIG. 17 is a cross-sectional view illustrating a second process of the method for producing the metal-resin composite in the third embodiment.
Figure 18:
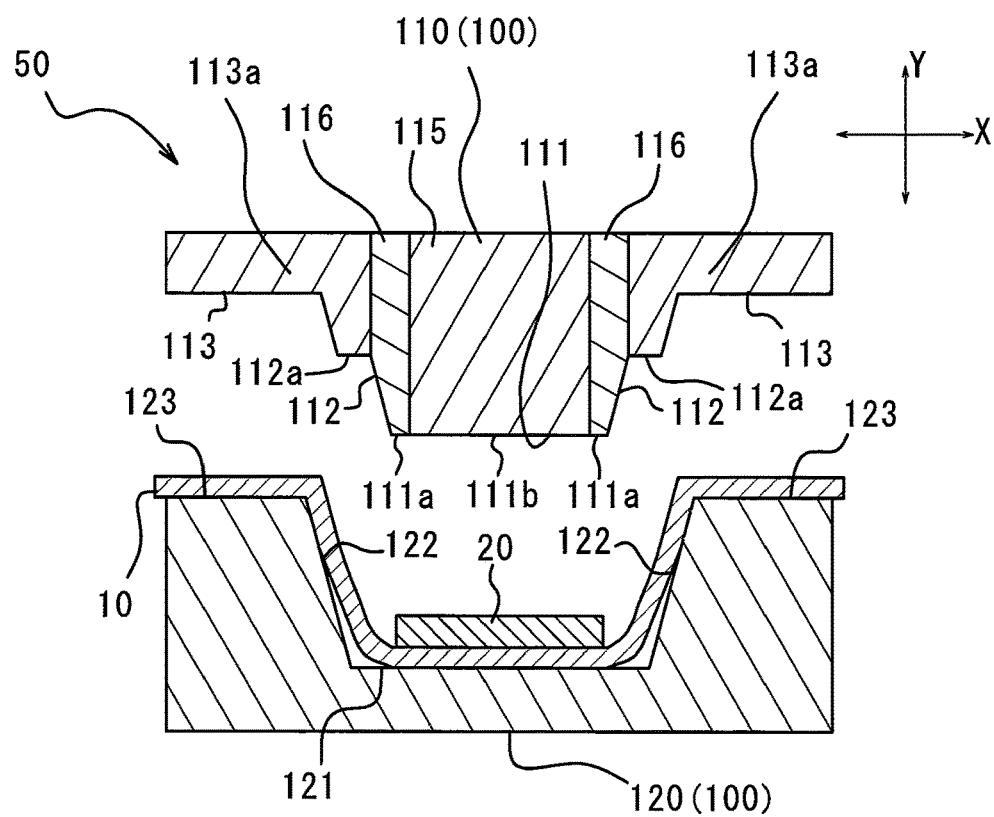
FIG. 18 is a cross-sectional view illustrating a third process of the method for producing the metal-resin composite in the third embodiment.

In the first pressing of the first to fourth processes illustrated in FIGS. 16 to 18, in the present embodiment, the metal plate 10 is press-formed in a state where the movable portion 116 is at the protruding position. The first to third processes of the present embodiment are substantially the same as the first to third processes of the first embodiment.

Figure 19:
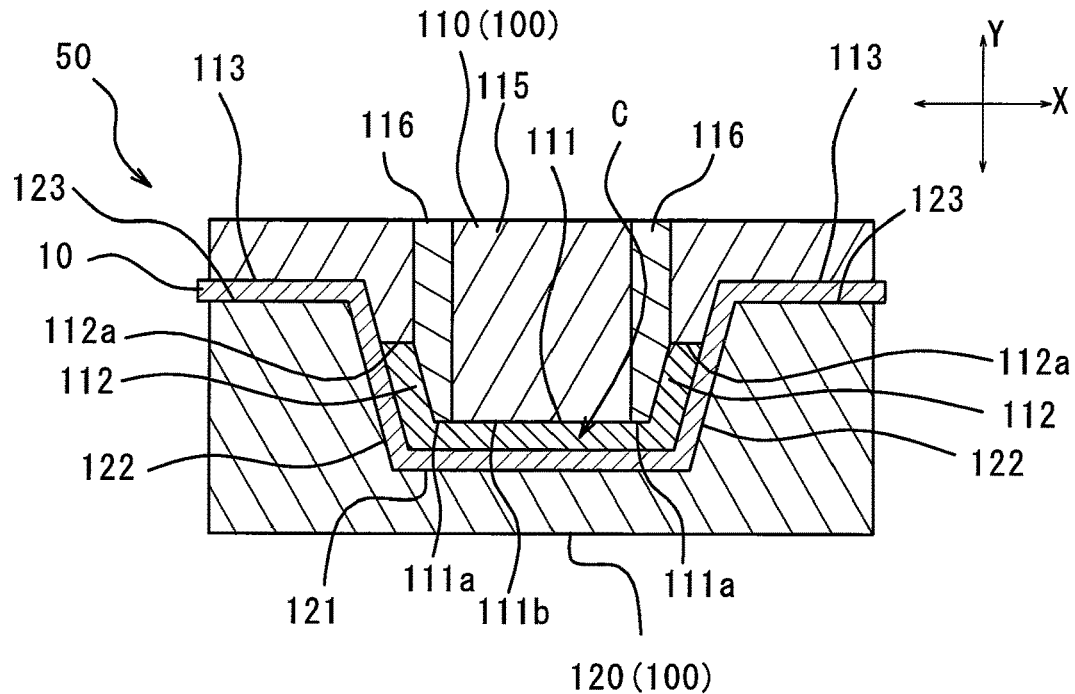
FIG. 19 is a cross-sectional view illustrating a fourth process of the method for producing the metal-resin composite in the third embodiment.
Figure 20:
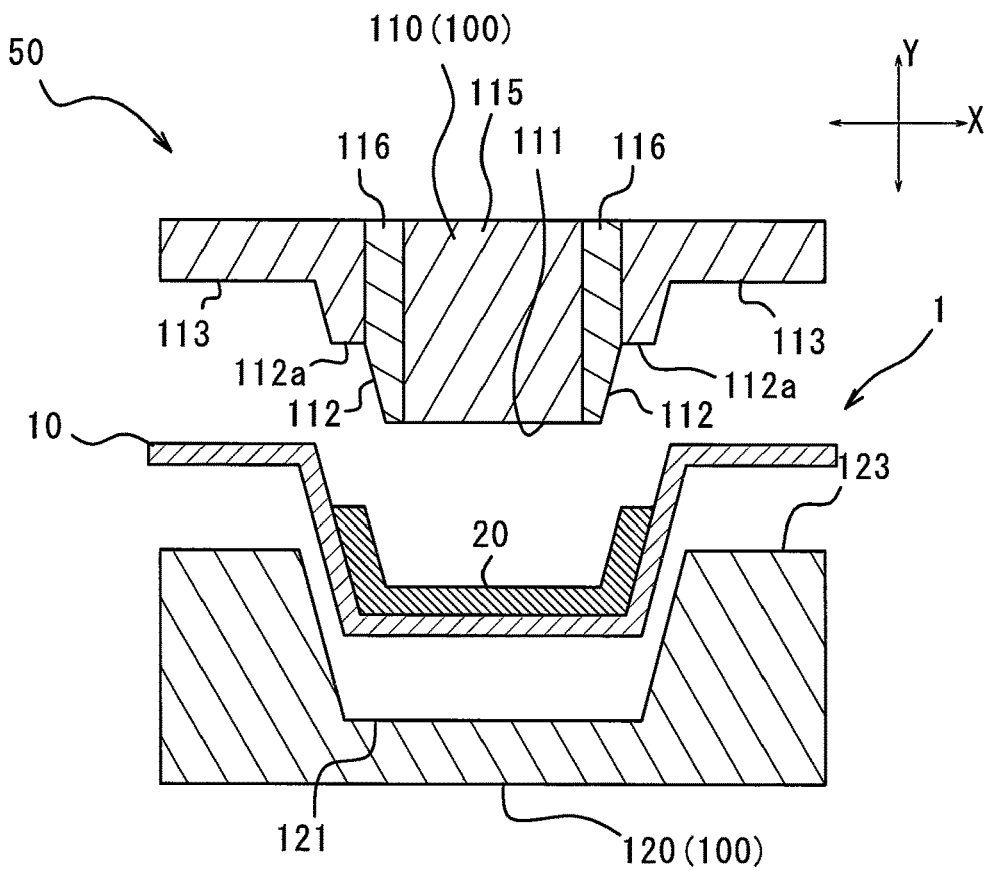
FIG. 20 is a cross-sectional view illustrating a fifth process of the method for producing the metal-resin composite in the third embodiment.

In the second pressing of the third to fifth processes illustrated in FIGS. 18 to 20, unlike the first embodiment, the metal plate 10 and the resin material 20 are press-formed in a state where the movable portion 116 is at the retracting position. The second to fifth processes of the present embodiment are substantially the same as the third to fifth processes of the first embodiment except for the movement of the movable portion 116.

According to the present embodiment, the metal plate 10 is press-formed in a state where the movable portion 116 is at the protruding position, and the metal plate 10 and the resin material 20 are integrally molded in a state where the movable portion 116 is at the retracting position, so that a portion from which the resin material 20 is removed is not formed in the molded metal-resin composite 1, and decrease in strength of the metal-resin composite 1 can be suppressed.

Although specific embodiments of the present invention and variations of the embodiments are described above, the present invention is not limited to the above embodiments, and various modifications can be made within the scope of the present invention. For example, an embodiment of the present invention may be obtained by appropriately combining the content of individual embodiments and variations.

Further, as the resin material 20, a thermoplastic resin impregnated with a glass fiber or a carbon fiber may be used. In this case, the resin material 20 is put into the mold 100 in a state of being heated and softened. Then, the resin material 20 is cooled and cured on the metal plate 10 in the mold 100 so that the metal-resin composite 1 is produced.

The first press surface 111a of the upper mold 110 is provided at both ends in the lateral direction of the first molding upper surface 111. However, the present invention is not limited to this. For example, the first press surface 111a may be provided in a central portion of the first molding upper surface 111. In this case, molding accuracy in a central portion of the bottom wall portion 2 can be improved. Further, for example, the first press surface 111a may be provided at a position corresponding to a portion where drilling or the like into the metal plate 10 is required after the metal-resin composite 1 is integrally molded. In this case, in the portion, drilling or the like can be performed on the metal plate 10 without excluding the resin material 20.

In the metal-resin composite 1, an adhesive layer may be provided between the metal plate 10 and the resin material 20. In this case, by providing the adhesive layer, the metal member 10 and the resin material 20 can be firmly integrally molded.

What is claimed is:

1. A mold for producing a metal-resin composite by press-forming a metal member followed by integrally molding the metal member that is press-formed and a resin material, the mold comprising:
an upper mold and a lower mold arranged so as to be opposed with each other, and being moved at least to an open position where the upper mold and the lower mold are apart from each other and a closed position where the upper mold and the lower mold define a cavity,
wherein the lower mold has a hollow inner space,
the lower mold includes:
a first inner molding lower surface defining a bottom surface of the hollow inner space, and
a pair of second inner molding surfaces defining side surfaces of the hollow inner space, each of the second inner molding surfaces extending upward from the first inner molding lower surface; and
wherein the upper mold includes:
a main body projecting toward the hollow inner space of the lower mold; and
a plurality of protruding portions, which are integral with the main body, projecting from outermost edges of the main body toward the first inner molding lower surface of the lower mold and arranged intermittently, wherein
each of the plurality of protruding portions has a first press surface for press-forming the metal member at a tip end thereof,
the main body has a second press surface for integrally molding the metal member and the resin material at a lower end portion thereof, and
a distance between the first press surface of each of the plurality of protruding portions and the first inner molding lower surface of the lower mold is shorter than a distance between the second press surface and the first inner molding lower surface of the lower mold at the closed position where the main body of the upper mold is disposed in the hollow inner space of the lower mold.

2. The mold according to claim 1, wherein the distance between the first press surface of each of the plurality of protruding portions and the first inner molding lower surface of the lower mold is set to be at least partially equal to a thickness of the metal member at the closed position.

3. The mold according to claim 1, wherein
the metal-resin composite has a bottom wall portion extending in a horizontal direction and side wall portions rising from both ends of the bottom wall portion in a cross section perpendicular to a longitudinal direction of the metal-resin composite,
the upper mold includes:
a first molding upper surface that includes the first press surface of each of the plurality of protruding portions and the second press surface, and molds the bottom wall portion; and
a pair of second molding upper surfaces that mold the side wall portions, and
the first press surface of each of the plurality of protruding portions is provided continuously with a second molding upper surface of the pair of second molding upper surfaces.

4. A mold for producing a metal-resin composite by press-forming a metal member followed by integrally molding the metal member that is press-formed and a resin material, the mold comprising:
an upper mold and a lower mold arranged so as to be opposed with each other, and being moved at least to an open position where the upper mold and the lower mold are apart from each other and a closed position where the upper mold and the lower mold define a cavity,
wherein the lower mold has a hollow inner space,
the lower mold includes:
a first inner molding lower surface defining a bottom surface of the hollow inner space, and
a pair of second inner molding surfaces defining side surfaces of the hollow inner space, each of the second inner molding surfaces extending upward from the first inner molding lower surface; and
wherein the upper mold includes:
a main body projecting toward the hollow inner space of the lower mold; and
a plurality of protruding portions, which are integral with the main body, projecting from the main body toward the first inner molding lower surface of the lower mold and arranged intermittently, wherein
each of the plurality of protruding portions has a first press surface for press-forming the metal member at a tip end thereof,
the main body has a second press surface for integrally molding the metal member and the resin material at a lower end portion thereof,
a distance between the first press surface of each of the plurality of protruding portions and the first inner molding lower surface of the lower mold is shorter than a distance between the second press surface and the first inner molding lower surface of the lower mold at the closed position where the main body of the upper mold is disposed in the hollow inner space of the lower mold, wherein
the metal-resin composite has a bottom wall portion extending in a horizontal direction and side wall portions rising from both ends of the bottom wall portion in a cross section perpendicular to a longitudinal direction of the metal-resin composite,
the upper mold includes:
a first molding upper surface that includes the first press surface of each of the plurality of protruding portions and the second press surface, and molds the bottom wall portion; and
a pair of second molding upper surfaces that mold the side wall portions,
the first press surface of each of the plurality of protruding portions is provided continuously with a second molding upper surface of the pair of second molding upper surfaces, and
wherein the first press surfaces are intermittently arranged along the longitudinal direction.

5. An apparatus for producing a metal-resin composite by press-forming a metal member followed by integrally molding the metal member that is press-formed and a resin material, the apparatus comprising:
an upper mold and a lower mold arranged so as to be opposed with each other; and
a drive unit that moves at least one of the upper mold and the lower mold at least to an open position where the upper mold and the lower mold are apart from each other and a closed position where the upper mold and the lower mold define a cavity,
wherein the lower mold has a hollow inner space,
the lower mold includes:
a first inner molding lower surface defining a bottom surface of the hollow inner space, and
a pair of second inner molding surfaces defining side surfaces of the hollow inner space, each of the second inner molding surfaces extending upward from the first inner molding lower surface; and wherein the upper mold includes:

a main body projecting toward the hollow inner space of the lower mold; and a plurality of protruding portions, which are integral with the main body, projecting from outermost edges of the main body toward the first inner molding lower surface of the lower mold and arranged intermittently, wherein each of the plurality of protruding portions has a first press surface for press-forming the metal member at a tip end thereof, the main body has a second press surface for integrally molding the metal member and the resin material at a lower end portion thereof, and a distance between the first press surface of each of the plurality of protruding portions and the first inner molding lower surface of the lower mold is shorter than a distance between the second press surface and the first inner molding lower surface of the lower mold at the closed position where the main body of the upper mold is disposed in the hollow inner space of the lower mold.

* * * * *